United States Patent
Lawrence et al.

(10) Patent No.: US 10,369,751 B2
(45) Date of Patent: Aug. 6, 2019

(54) TOP-LOADING STRADDLE-MOUNTED PIPE FUSION MACHINE

(71) Applicant: McElroy Manufacturing, Inc., Tulsa, OK (US)

(72) Inventors: Jason A. Lawrence, Owasso, OK (US); James R. Perrault, Tulsa, OK (US); David W. Porter, Tulsa, OK (US); Timothy M. Thoman, Tulsa, OK (US); Bobby Lee Murray, Tulsa, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 386 days.

(21) Appl. No.: 15/005,554

(22) Filed: Jan. 25, 2016

(65) Prior Publication Data

US 2016/0136881 A1    May 19, 2016

Related U.S. Application Data

(63) Continuation of application No. 14/029,652, filed on Sep. 17, 2013, now Pat. No. 9,242,410.

(51) Int. Cl.
*B29C 65/20* (2006.01)
*B29C 65/78* (2006.01)
(Continued)

(52) U.S. Cl.
CPC .......... *B29C 65/7841* (2013.01); *B29C 65/20* (2013.01); *B29C 65/2092* (2013.01); *B29C 65/7802* (2013.01); *B29C 66/1142* (2013.01); *B29C 66/5221* (2013.01); *B29C 66/71* (2013.01); *B29C 66/8242* (2013.01); *B29C 66/86521* (2013.01); *F16L 1/065* (2013.01); (Continued)

(58) Field of Classification Search
CPC .. B23K 37/053; B23K 37/0533; B29C 65/20; B29C 65/2092; B29C 65/7841; B29C 66/1142; B29C 66/5221; B29C 66/86521; B29L 2023/22; B66C 1/42; B66C 1/425; B66C 1/427; F16L 1/024; F16L 1/06; F16L 1/065
See application file for complete search history.

(56) References Cited

U.S. PATENT DOCUMENTS 2,958,125 A   11/1960   Nichols
3,207,326 A    9/1965   Enix
(Continued)

*Primary Examiner* — Michael A Tolin
(74) *Attorney, Agent, or Firm* — Gable Gotwals; Frank J. Catalano

(57) ABSTRACT

A fusion machine which can be top-loaded on very large polyolefin pipes and pipelines has jaws which consist of an upper half jaw and lower left and right complemental jaws which pivot on the half jaw. Left and right actuators connected between the complemental jaws and the half jaw operate in one direction to cause the complemental jaws to rotate to an opened condition in which the upper half jaw can be lowered onto and lifted from the pipes to be fused and in the other direction to cause the complemental jaws to rotate to a closed condition in which the pipes to be fused are gripped so substantially around their circumferences as to resist their deformation from round during manipulation by the machine. The top-loading machine minimizes the need for heavy equipment to load and unload pipe to and from the fusion machine.

8 Claims, 10 Drawing Sheets

(51) Int. Cl.
   *F16L 1/06*     (2006.01)
   *B29C 65/00*    (2006.01)
   *B29L 23/00*    (2006.01)

(52) U.S. Cl.
   CPC ....... *B29C 65/2076* (2013.01); *B29L 2023/22* (2013.01)

(56) References Cited

U.S. PATENT DOCUMENTS

| | | |
|---|---|---|
| 4,286,914 A | 9/1981 | Davidson, Jr. |
| 5,127,335 A * | 7/1992 | Whitaker, Jr. .......... E01B 29/02 104/3 |
| 5,206,980 A | 5/1993 | Chapman |
| 5,704,293 A * | 1/1998 | Koivisto ................. E01B 29/02 104/7.1 |
| 5,814,182 A | 9/1998 | McElroy, II et al. |
| 5,830,312 A | 11/1998 | Weimer et al. |
| 6,481,924 B1 * | 11/2002 | Smolders ................. B62D 7/02 180/408 |
| 9,242,410 B2 * | 1/2016 | Lawrence ........... B29C 65/7841 |
| 2010/0308609 A1 | 12/2010 | LaValley et al. |

\* cited by examiner

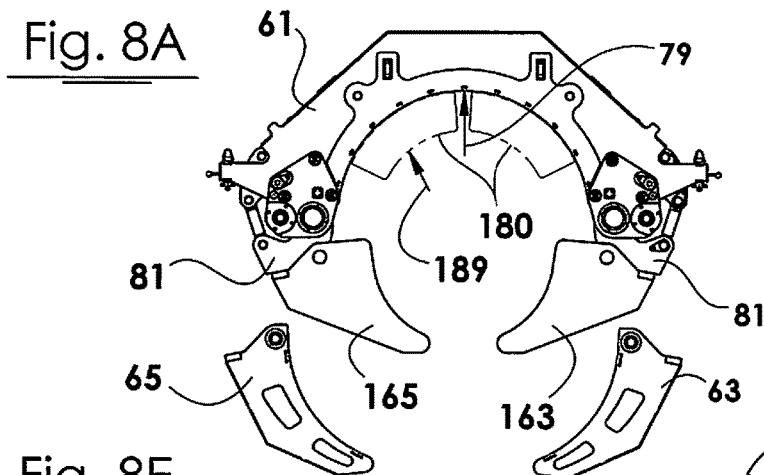
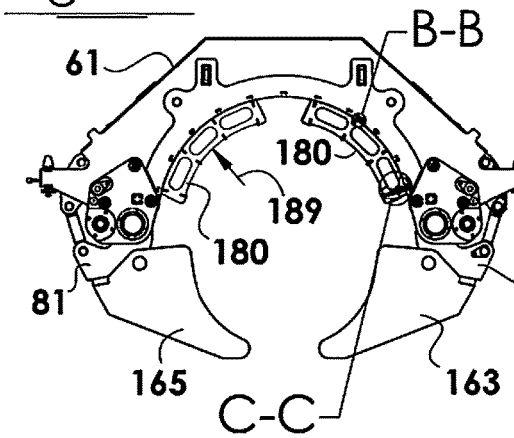
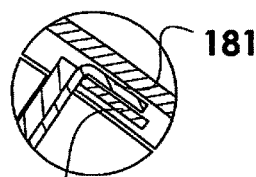
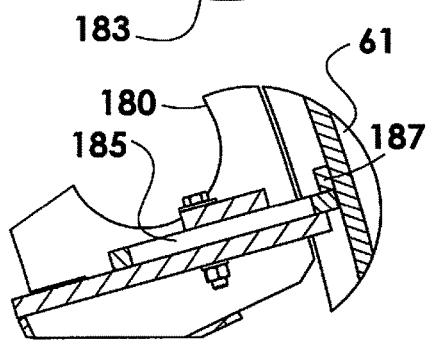
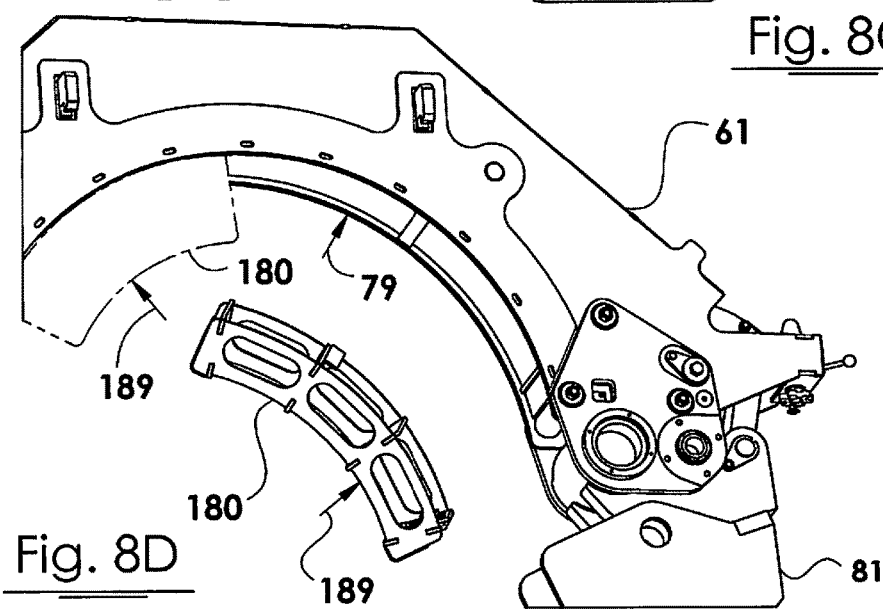

TOP-LOADING STRADDLE-MOUNTED PIPE FUSION MACHINE

CROSS-REFERENCE TO PENDING APPLICATIONS

This application is a continuation application which claims priority to U.S. patent application Ser. No. 14/029,652 filed Sep. 17, 2013, now U.S. Pat. No. 9,242,410, incorporated herein by reference.

BACKGROUND OF INVENTION

This invention relates generally to fusion of polyolefin pipes and more particularly concerns the machines used to perform the pipe fusion process.

Fusion of small diameter pipe may usually be accomplished by hand-held, stand-mounted or cart-carried fusion devices. Little, if any, heavy equipment is necessary in the performance of the fusion process. Sticks of small diameter pipe are typically manually loaded through the top or end of the device for fusion. The fusion device can often be manually disconnected and removed from the pipeline or, at worst, the pipeline is manually released and pulled from the device manually or using a relatively small motorized vehicle.

Fusion of large diameter pipe typically requires fusion machines mounted on wheeled carts or motorized vehicles and the pipe sticks and pipelines are loaded and unloaded using various types of heavy equipment. A first pipe stick is loaded onto the top of lower fixed half jaws and upper half jaws pivoted on the lower half jaws, usually manually, to clamp the first pipe stick to the fixed jaws. A second pipe stick is loaded onto the top of lower sliding half jaws and upper half jaws are pivoted on the lower jaws, usually manually, to clamp the second pipe stick to the sliding jaws. Once the fusion process is completed and the fixed and sliding jaws are opened, the fused pipeline is pulled to position the free end of second stick in the fixed jaws and a third stick is loaded onto the sliding jaws for fusion into the pipeline. The equipment for loading the pipe sticks onto the sliding jaws and pulling the pipeline from the fixed jaws is likely very heavy and expensive and requires additional operators.

It is, therefore, an object of this invention to provide a pipe fusion machine which reduces the need for use of additional heavy pipe-handling equipment in performance of the pipe fusion process. And it is an object of this invention to provide a pipe fusion machine which simplifies the pipe-handling steps of the pipe fusion process.

SUMMARY OF INVENTION

In accordance with the invention, a machine for fusing polyolefin pipes has an upper half jaw, lower left and right complemental jaws, left and right pivots and at least one, and preferably left and right, actuators. The upper half jaw has an inside radius that is substantially equal to the selected outside radius of the pipes being fused. The lower left and right complemental jaws each have an inside radius that is substantially equal to the inside radius of the upper half jaw. The left and right pivots connect the lower left and right complemental jaws to their respective left and right portions of the half jaw. The left and right actuators are connected between the lower left and right complemental jaws and their respective left and right portions of the half jaw. Operation of the actuators in one direction causes the lower left and right complemental jaws to rotate to an opened condition in which the upper half jaw can be lowered onto and lifted from the pipes to be fused. Operation of the actuators in its other direction causes the lower left and right complemental jaws to rotate to a closed condition in which the pipes to be fused are gripped so substantially around their circumferences as to resist their deformation from round during manipulation by the machine and resist axial slippage during fusion.

The machine may also include at least one replacement set of lower left and right complemental jaws. Each of the replacement sets is interchangeable with the lower left and right complemental jaws and with each other. Each replacement set has a different inside radius and their inside radii are each different than the inside radius of the upper half jaw. For each replacement set of complemental jaws, at least one insert is provided that can be mounted on the inside radius of the upper half jaw. The inside radius of the insert or inserts associated with a set of complemental jaws is substantially equal to the inside radius of that set of complemental jaws. Thus, each replacement set of complemental jaws and its corresponding half jaw inserts enables use of the same machine to handle pipes and/or pipelines of a different outside radius.

The free ends of the lower left and right complemental jaws and their replacement sets, if any, are tapered toward their respective inside radii to facilitate their closure beneath the pipe or pipeline lying on the ground during pick-up.

Each actuator preferably includes a piston cylinder and a linkage that are serially connected between the lower left and right complemental jaws and the left and right portions of the half jaw, respectively. Each linkage preferably includes a toggle and a link. The toggle is pivoted at a first axis on the upper half jaw. It is also pivotally connected at a second axis to a piston of its respective cylinder and at a third axis to one end of a link. The other end of the link is pivotally connected at a fourth axis to a complemental jaw hub which is pivoted on the lower portion of the upper half jaw. The complemental jaw is attached to and moves in unison with the complemental jaw hub. The axes are parallel and the linkage provides such a mechanical advantage between its respective cylinder and complemental jaw as to assure that sufficient resistance to deviation of the pipeline or pipe stick from round during manipulation by the machine is maintained as long as the grip is closed on the pipeline or pipe stick and to resist axial slippage.

The machine preferably includes a gantry, a pair of spaced apart tracks and telescoping legs mounted at the front and rear of each track and supporting the gantry above the tracks. A carriage mounted on the gantry has spaced parallel guide rods. One upper half jaw is mounted for reciprocal sliding on the guide rods toward and away from another upper half jaw which is fixed on the guide rods. Another set of lower left and right complemental jaws, each having an inner radius substantially equal to the inner radius of said upper half jaw, is connected by another set of left and right pivots to their corresponding other left and right portions of the other half jaw. Another actuator, and preferably another set of left and right actuators, are each connected between their corresponding other lower left and right complemental jaws and left and right portions of the other half jaw, respectively. One direction of operation of the other left and right actuators causes the other lower left and right complemental jaws to simultaneously rotate to an opened condition in which the other upper half jaw can be lowered onto and lifted from the pipes to be fused. The other direction of operation of the other left and right actuators causes the other lower left and right complemental jaws to rotate to a closed condition in which the pipes to be fused are gripped so substantially around their circumferences as to resist deformation thereof from round during manipulation by the machine.

BRIEF DESCRIPTION OF THE DRAWINGS

Other objects and advantages of the invention will become apparent upon reading the following detailed description and upon reference to the drawings in which:

FIG. 8A is a front elevation assembly view of the jaw of FIG. 7A;

FIG. 8B is an enlarged front elevation view of the area BB of FIG. 8E;

FIG. 8C is an enlarged front elevation view of the area CC of FIG. 8E;

FIG. 8D is an enlarged perspective assembly view of the upper half jaw and inserts of FIG. 8A;

FIG. 8E is a front elevation view of the jaw of FIG. 8A assembled;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

The Machine

Figure 1:
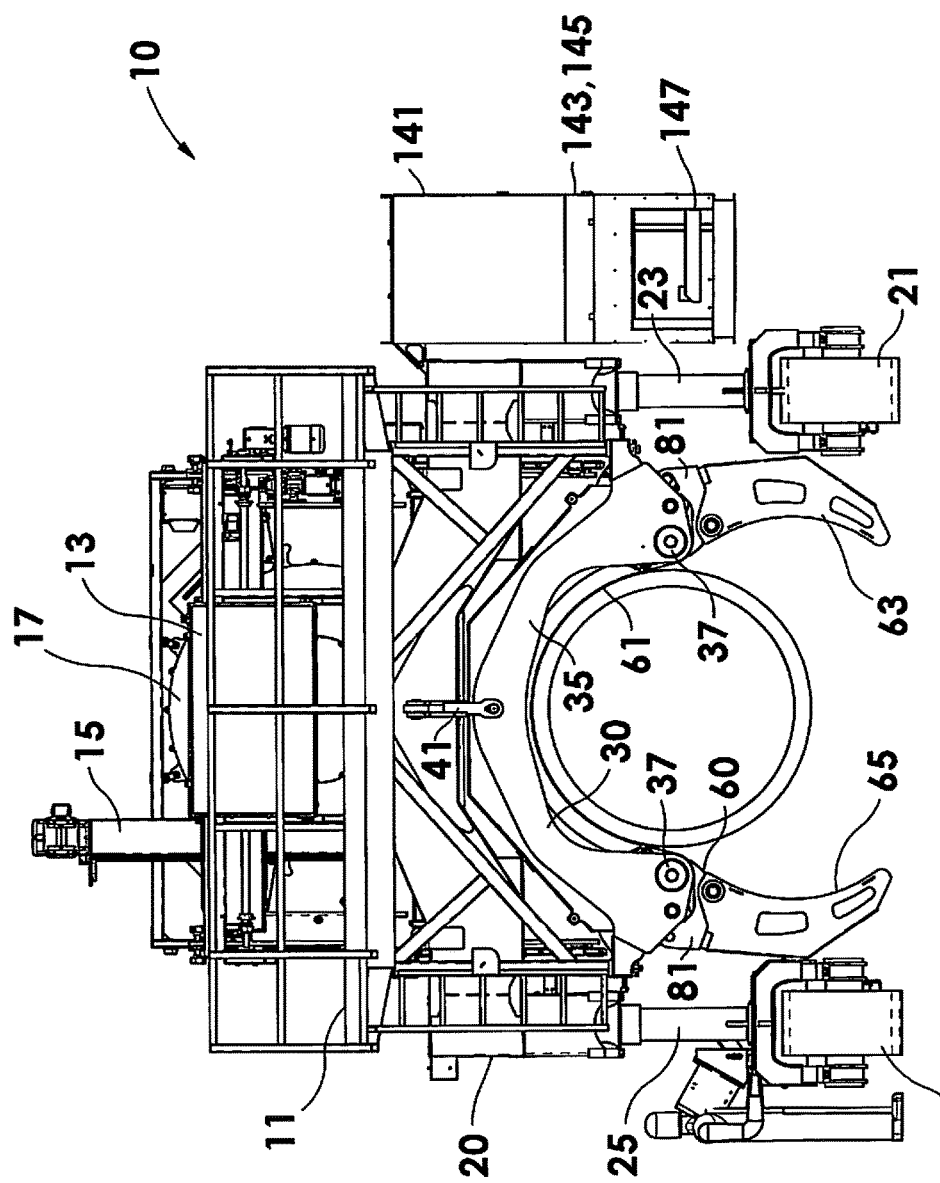
FIG. 1 is a front elevation view of a fusion machine according to the invention.
Figure 2:
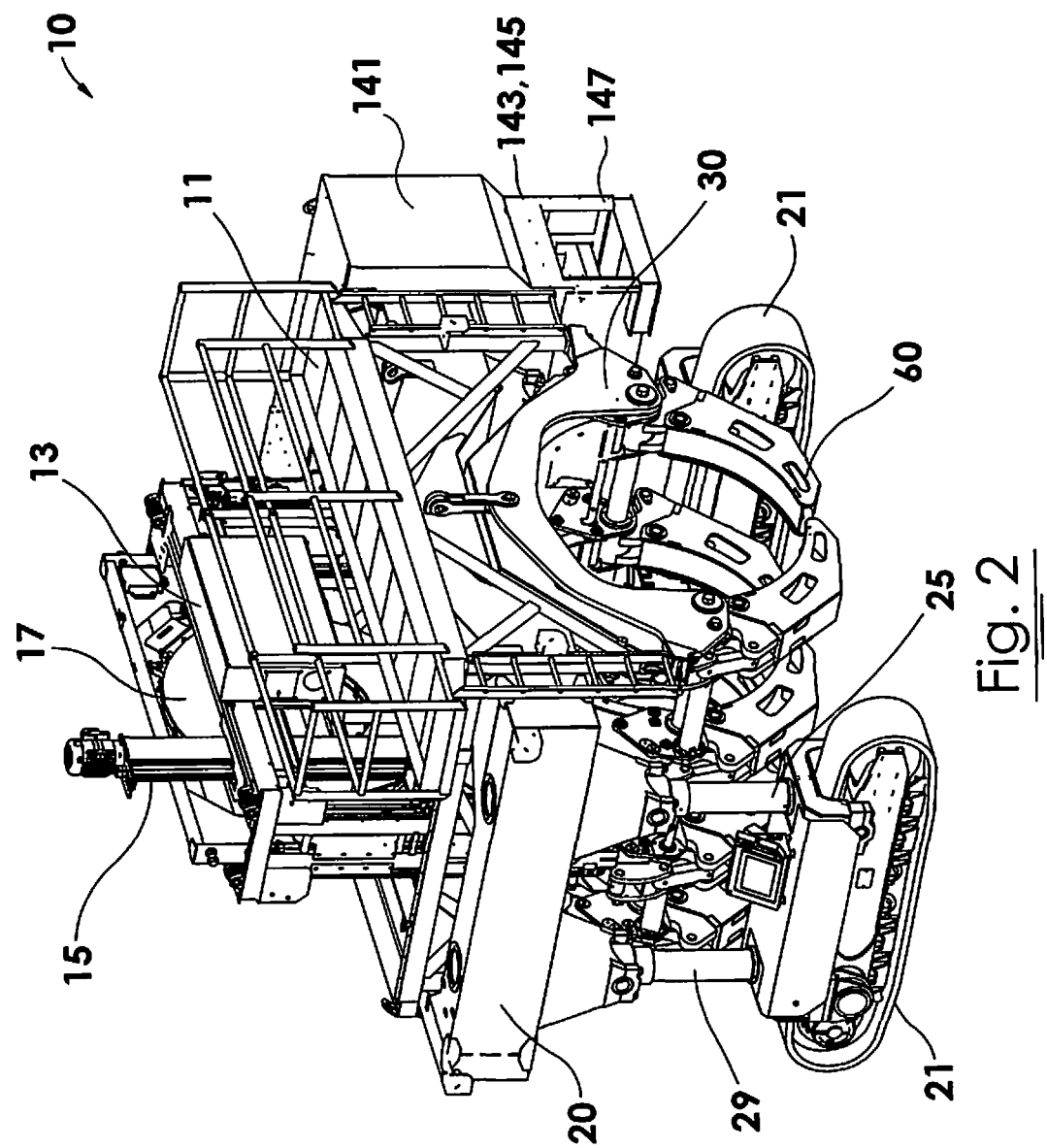
FIG. 2 is a perspective view of the machine of FIG. 1.

Looking first at FIGS. 1 and 2, a track-driven pipe fusion machine 10 is configured to be top-loaded onto a pipe stick S and onto a pipeline L to which the stick is to be fused.

The machine 10 has a gantry 20 which is transported on a pair of parallel tracks 21 to travel along the pipeline path terrain. Telescoping cylinder legs 23, 25, 27 and 29 connected to the gantry 20 at each of its corners are operable to vary the gantry's elevation and level in relation to the terrain. A carriage assembly 30 including jaws 60 for grabbing the pipeline L and pipe stick S during the fusion process is suspended from and changes elevation and level with the gantry 20.

The machine 10 performs the fusion process while stopped in a position in which the tracks 21 straddle and the gantry 20 spans across the pipeline L and the pipe stick S. The jaws 60 are used to pick up, manipulate and release the pipeline L and a pipe stick S during the fusion process.

The jaws 60 are opened and closed in response to actuators 110 which assure that sufficient resistance to deviation of the pipeline L and/or pipe stick S from round during manipulation by the machine 10 is maintained as long as the grip is closed on the pipeline L and/or pipe stick S and prevent axial slippage.

The machine 10 also includes an operator's platform 11 and control center 13, a facer assembly 15 and a heater assembly 17 for performance of the fusion process steps.

The Carriage Assembly

Figure 3:
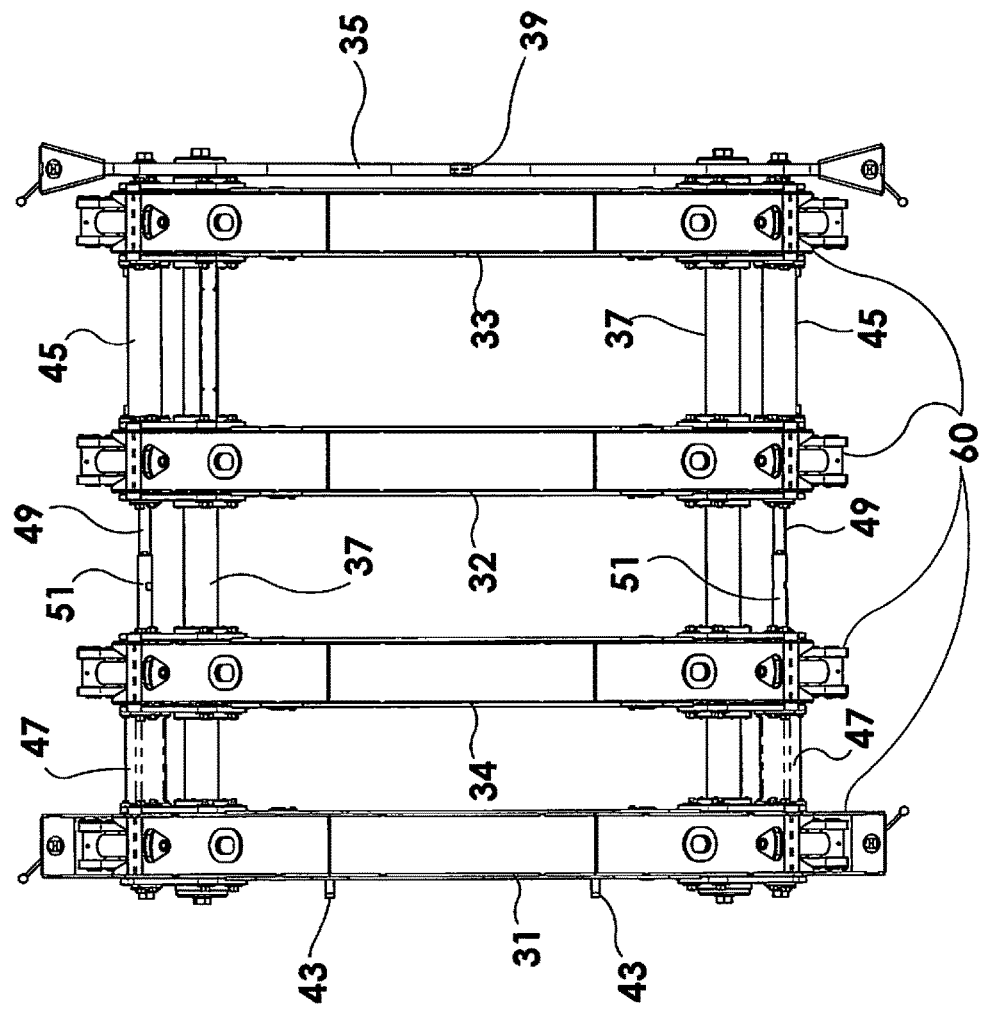
FIG. 3 is a top plan view of the carriage of the machine of FIG. 1.
Figure 4:
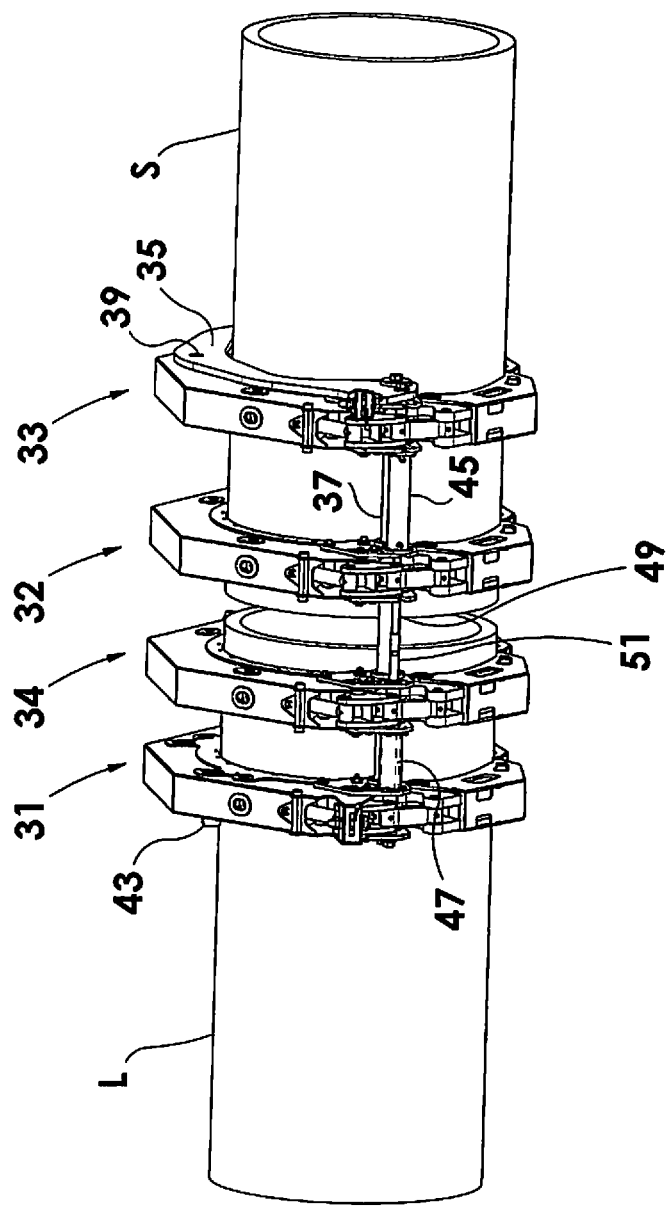
FIG. 4 is a perspective view of the machine of FIG. 1 gripping a pipe stick/pipeline.

Turning to FIGS. 3 and 4, at least one fixed jaw 31 is mounted on the rear end of the carriage assembly 30 for handling the pipeline L. Two sliding jaws 32 and 33 are mounted on the carriage assembly 30 for handling the pipe stick S. A fourth jaw 34 can be selectively connected for operation either as a second fixed or as a third sliding jaw. The carriage assembly 30 as shown in an exemplary 2×2 configuration in which the first 31 and fourth 34 jaws are fixed and the second 32 and third 33 jaws are sliding in unison. As best seen in FIG. 4, in this configuration the fixed jaws 31 and 34 will usually be used to grip the pipeline L and the sliding jaws 32 and 33 will usually be used to grip the pipe stick S. In a 3×1 configuration (not shown), the first jaw 31 is fixed and the second, third and fourth jaws 32, 33 and 34 are sliding in unison. In the 3×1 configuration the single fixed jaw 31 will usually be used to grip the pipeline L and the three sliding jaws 32, 33 and 34 will usually be used to grip the pipe stick S. This is especially useful if the pipe stick S is to be connected to a T-junction in a pipeline, in which case the length of the T may be too short for a multiple jaw grip. The principles herein disclosed are applicable to both the 2×2 and the 3×1 configurations of the carriage assembly 30.

In the 2×2 configuration shown, the carriage 30 has a guide rod support plate 35 at its forward end and the outboard fixed jaw 31 at its aft end. Guide rods 37 extend in parallel and are fixed between the plate 35 and the outboard fixed jaw 31. The support plate 35 has a central aperture 39 for connection to a mounting link 41 on the forward end of the gantry 20. The fixed jaw 31 has lugs 43 symmetrically positioned and engagable on the aft end of the gantry 20. The sliding jaws 32 and 33 are mounted on the forward portion of the guide rods 37 and are fixed against the opposite ends of the carriage cylinders 45 so that the sliding jaws 32 and 33 and the cylinders 45 move in unison on the guide rods 37. The fourth jaw 34 is mounted between the outboard fixed jaw 31 and the inboard sliding jaw 32 but is fixed in relation to the outboard fixed jaw 31 by jaw conversion links 47. The piston rods 49 of the carriage cylinders 45 extend through the inboard sliding jaw 32 and are fixed by rod extensions 51 to the first jaw 31. Thus, when the pistons 49 are retracted in the cylinders 45, the sliding jaws 32 and 33 move toward the fixed jaws 31 and 34 and, when the piston rods 49 are extended from the cylinders 45, the sliding jaws 32 and 33 move away from the fixed jaws 31 and 34.

In the 3×1 configuration, the jaw conversion links 47 connect the fourth jaw 34 to the inboard sliding jaw 32 and the rod extensions 51 extend through the fourth jaw 34 and are fixed to the fixed jaw 31.

The Jaws

Figure 5A:
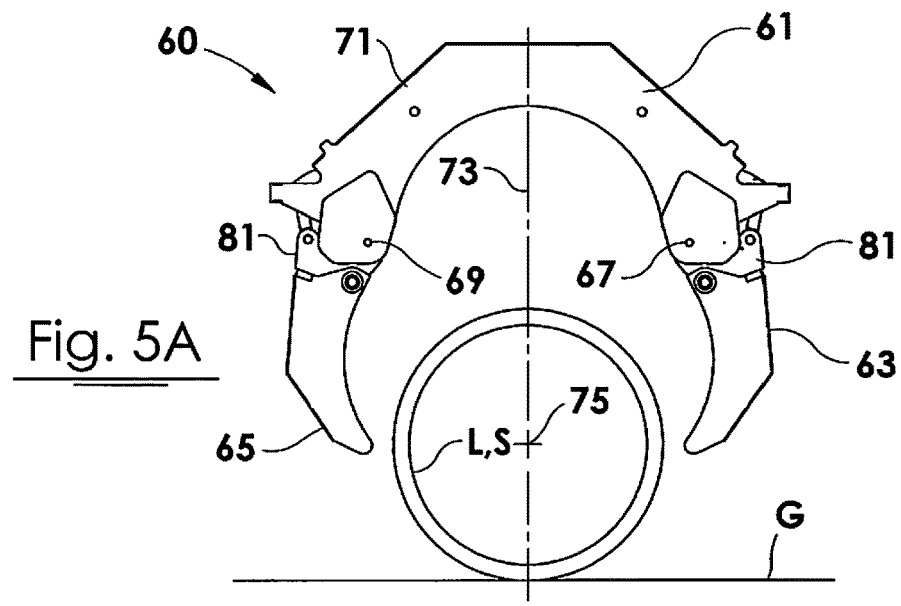
FIG. 5A is a front elevation view of a fully opened jaw of the machine of FIG. 1 positioned over a pipe/pipeline.
Figure 5B:
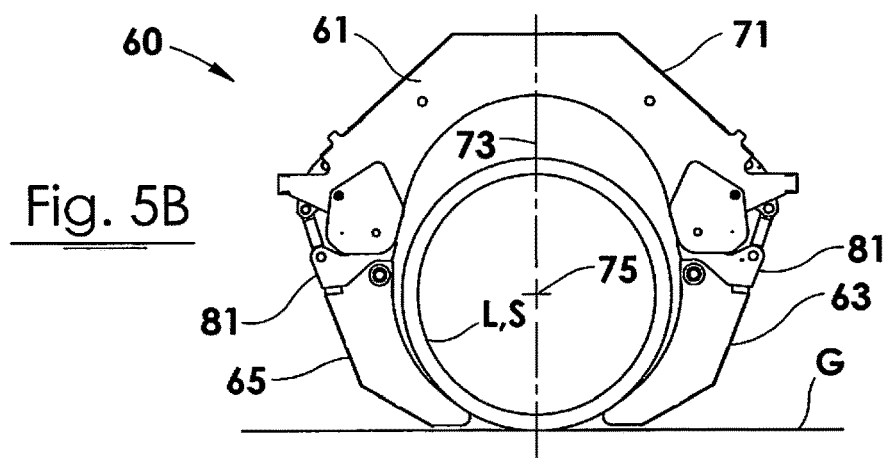
FIG. 5B is a front elevation view of the jaw of FIG. 5A lowered and partially closed at ground level on the pipe/pipeline.
Figure 5C:
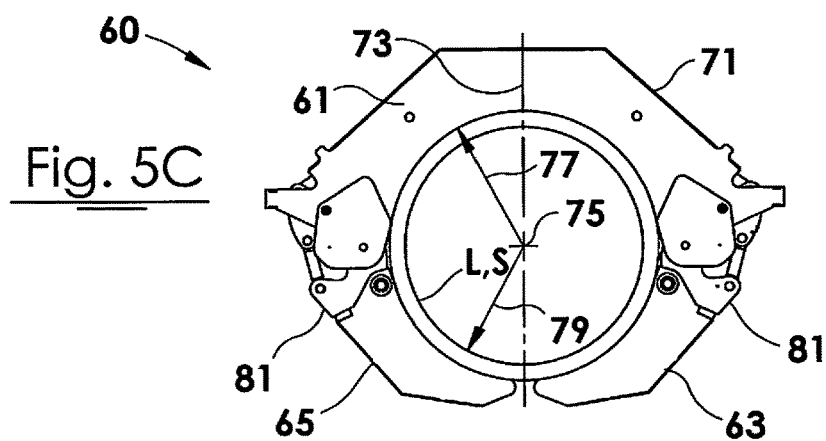
FIG. 5C is a front elevation view of the jaw of FIG. 5A fully closed on the pipe/pipeline.

Turning to FIGS. 5A, 5B and 5C, each carriage assembly jaw 60, whether fixed or sliding, includes an upper half jaw 61, lower left 63 and right 65 complemental jaws and left 67 and right 69 pivots. In this disclosure, the upper half jaw 61 is so-called because, as shown, it substantially affords 180° of the grip. The lower jaws 63 and 65 as shown are quarter or 90° grips, but need not necessarily be quarter or 90° jaws. They are referred to as complemental because, as shown, they substantially afford the remaining 180° to complete the circular grip. In the quarter jaw embodiment shown, the complemental jaws are symmetric with respect to the center plane 73, but in non-quarter jaw embodiments the complemental jaws will not by symmetric. The upper half jaw 61 has a generally trapezoidal outer perimeter 71 and is symmetric in relation to a vertical plane 73 through the center longitudinal axis 75 of the pipeline L and pipe stick S to be grasped. As best seen in FIG. 5C, it has an inside radius 77 that is substantially equal to the selected outside radius of the pipeline L and pipe stick S being fused.

For the purposes of this description, assume that the pipeline L or pipe stick S of FIGS. 5A, 5B and 5C have a two meter outside diameter and the upper half jaw 61, therefore, has a one meter inside radius. As best seen in FIG. 5C, the complemental jaws 61 and 63 each have an inside radius 79 that is substantially equal to the inside radius of the upper half jaw 61, in this example also one meter.

As best seen in FIG. 5B, the outer perimeters of the complemental jaws 63 and 65 are tapered toward their free ends to facilitate their insertion between the lower half of the pipe stick S or pipeline L and the ground G to pick up the pipe stick S or pipeline L. As shown, the tapers increase incrementally toward the tips of the complemental jaws 63 and 65 so as to converge toward their respective inside radii 79.

Figure 6A:
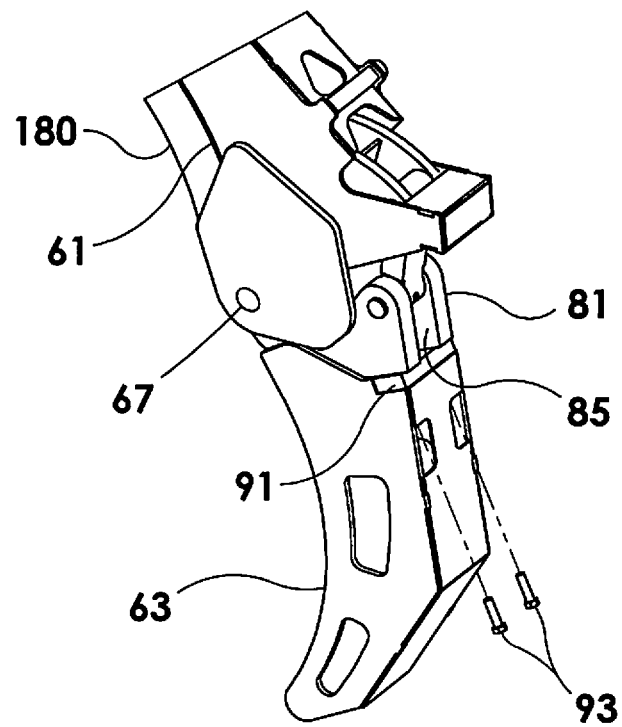
FIG. 6A is a perspective assembly view of a complemental jaw and a complemental jaw adapter hub of the machine of FIG. 1.
Figure 6B:
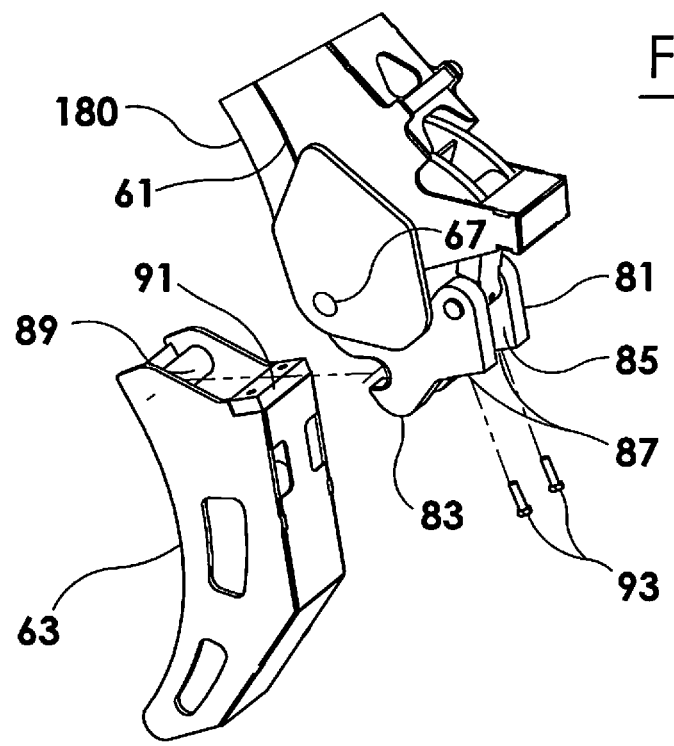
FIG. 6B is a perspective view of the complemental jaw and complemental jaw adapter hub of FIG. 6A assembled.

Continuing to look at FIGS. 5A, 5B and 5C, the complemental jaws 63 and 65 have adapter hubs 81 at their upper ends. As best seen in FIGS. 6A and 6B, the left hub 81 has a hook 83 on its inside portion and a clevis 85 on its outside portion with lands 87 on the bottom of the clevis 85. The left complemental jaw 63 has a retaining pin 89 on its upper inside portion and a stop plate 91 on its upper outside portion. The left complemental jaw 63 is attached to the left hub 81 by seating the retaining pin 89 in the hook 83 and securing the stop plate 91 in abutment with the lands 87 on the clevis 85 using screws 93 extending through the stop plate 91 and into the clevis 85. The left hub 81 is pivoted for rotation on the lower portion of the left upper half jaw 61 about a shaft 95 on the left upper half jaw 61 and the left complemental jaw 63 pivots in unison with the left hub 81 to which it is attached. The right hub 81 and complemental jaw pivot 69 configuration mirrors the left hub 81 and complemental jaw pivot 69 configuration of FIGS. 6A and 6B.

Figure 7A:
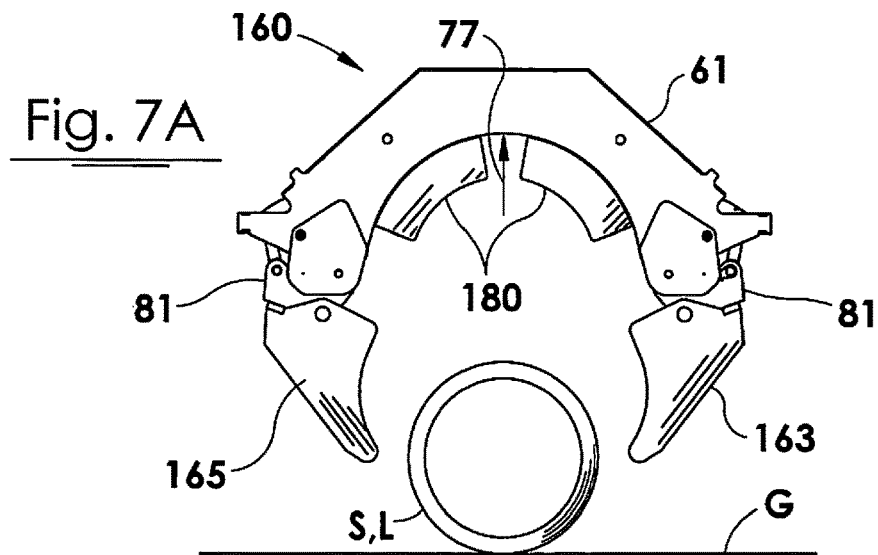
FIG. 7A is a front elevation view of a fully opened jaw of the machine of FIG. 1 modified by replacement complemental jaws and half jaw inserts and positioned over a pipe/pipeline.
Figure 7B:
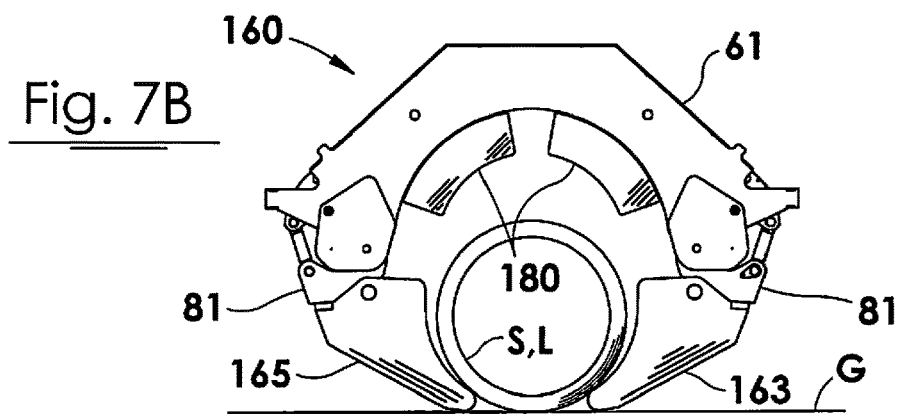
FIG. 7B is a front elevation view of the jaw of FIG. 7A lowered and partially closed at ground level on the pipe/pipeline.
Figure 7C:
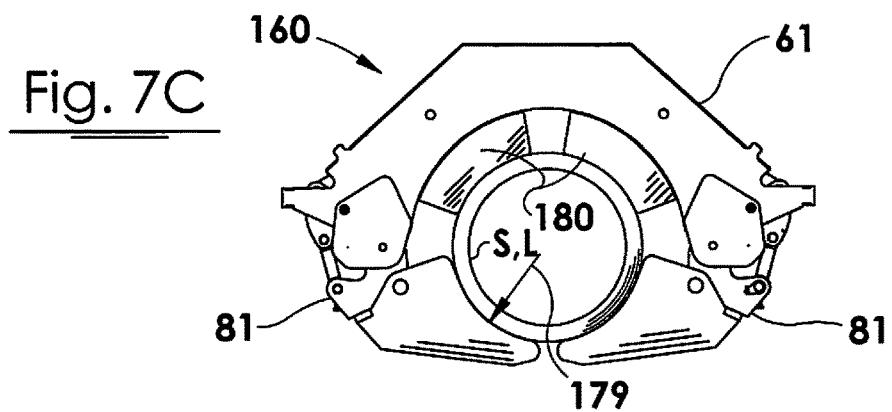
FIG. 7C is a front elevation view of the jaw of FIG. 7A fully closed on the pipe/pipeline.

As seen in FIGS. 7A, 7B and 7C, the machine may also include at least one replacement set 160 of lower left 163 and right 165 complemental jaws. Each replacement set 160 of complemental jaws 163 and 165 has a different inside radius 179 than the two meter diameter set 60 discussed above and the other replacement sets 160. Assume that the pipeline L or pipe stick S of FIGS. 7A, 7B and 7C have a 54" outside diameter and the upper half jaw 61, therefore, has a 27" inside radius 77. As best seen in FIG. 7C, the lower left and right complemental jaws 163 and 165 each have an inside radius 179 that is substantially equal to the inside radius of the upper half jaw inserts 180, in this example also 27". For this replacement set 160 of complemental jaws 163 and 165, at least one, and as shown two, inserts 180 are provided that are mountable on the inside radius 77 of the upper half jaw 61. The lower complemental jaw FIGS. 6A and 6B for replacements 160 are installed as explained above in relation to the complemental jaws 63 and 65 of the two meter outside diameter pipeline L and pipe sticks S.

Installation of the inserts 180 for the upper half jaw 61 is illustrated in FIGS. 8A, 8B, 8C, 8D and 8E in relation to the 27" outside radius pipeline L and pipe sticks S. As seen in FIG. 8A, two inserts 180 are used to change the inside radius 77 of the upper half jaw 61. Looking at FIG. 8B, an L-shaped retainer 181 extends outward from the insert 180 for engagement against a bar 183 on the half jaw 61. Turning to FIG. 8C, once the insert retainer 181 is engaged against the half jaw bar 183, a latch 185 on the insert 180 slides into and out of engagement with a catch 187 on the half jaw 61 to secure or release the insert 180 to or from the half jaw 61, respectively. As seen in FIG. 8E, the inside radius 189 of the inserts 180 associated with a set of complemental jaws 160 is substantially equal to the inside radius 79 of that set of complemental jaws 160. Thus, each set of corresponding complemental jaws 160 and half jaw inserts 180 enables use of the same machine 10 to handle pipe sticks S and pipelines L of a different outside radius.

In this exemplary application, the pipeline L or pipe sticks S of FIGS. 7A, 7B and 7C have 54" outside diameters. The upper half jaw 61 and its associated replacement lower complemental jaws 163 and 165 will, therefore, have one or more, and as shown, two inserts 180 defining a 27" inside radius.

As seen in FIGS. 7A, 7B and 7C, the free ends of the replacement sets 160 of lower left and right complemental jaws 163 and 165 are, similar to the two meter diameter complemental jaws 63 and 65, tapered toward their respective inside radii 179 to facilitate their closure beneath the pipe sticks S or pipeline L during pick-up.

The two meter (78.7") and 54" pipe diameters have been chosen for FIGS. 5A-C and 7A-C, respectively, because it is presently anticipated that the same fusion machine 10 will be useful for fusing pipes of any diameter within that range. However, fusion machines applying the principles herein taught can be made in many different sizes to accommodate different ranges of pipe diameters.

The Actuators

Figure 9A:
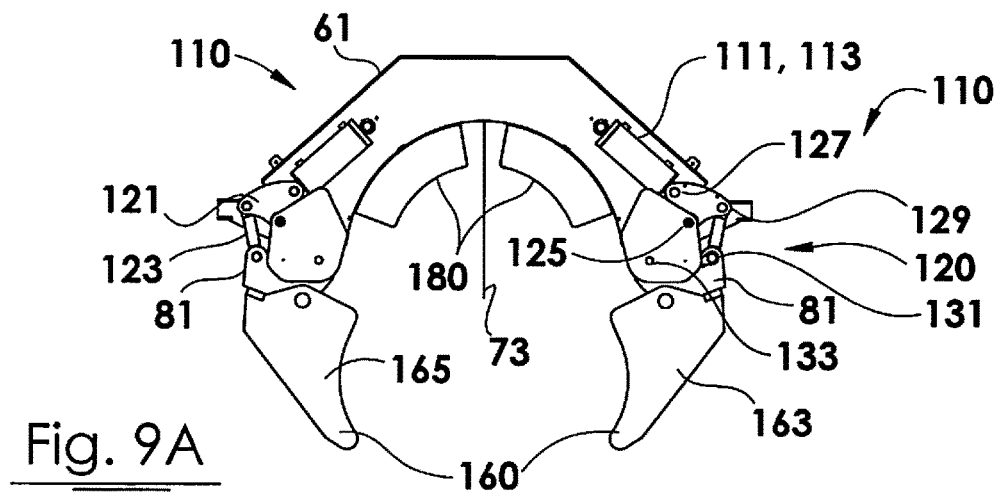
FIG. 9A is a front elevation view illustrating the operation of the cylinders/pistons and linkages of the jaw of FIG. 7A to open the jaw.
Figure 9B:
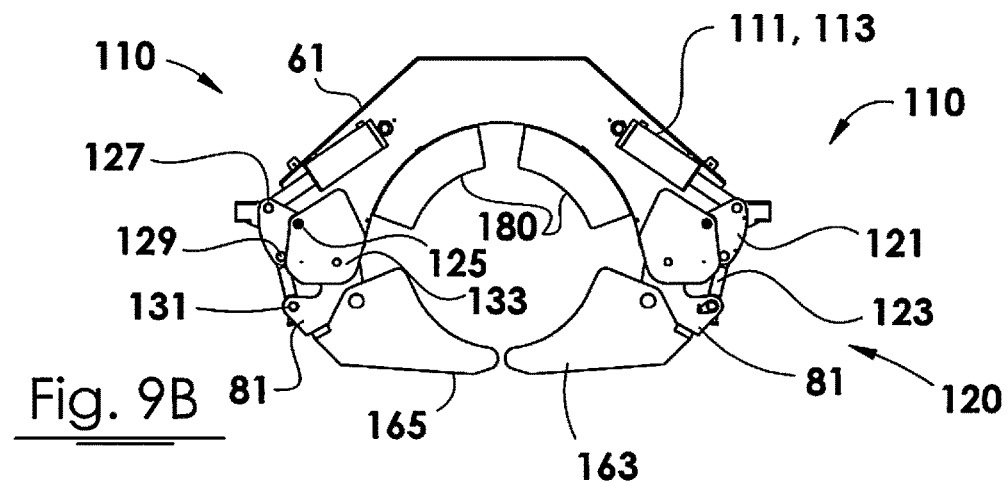
FIG. 9B is a front elevation view illustrating the operation of the cylinders/pistons and linkages of the jaw of FIG. 7A to close the jaw.
Figure 9C:
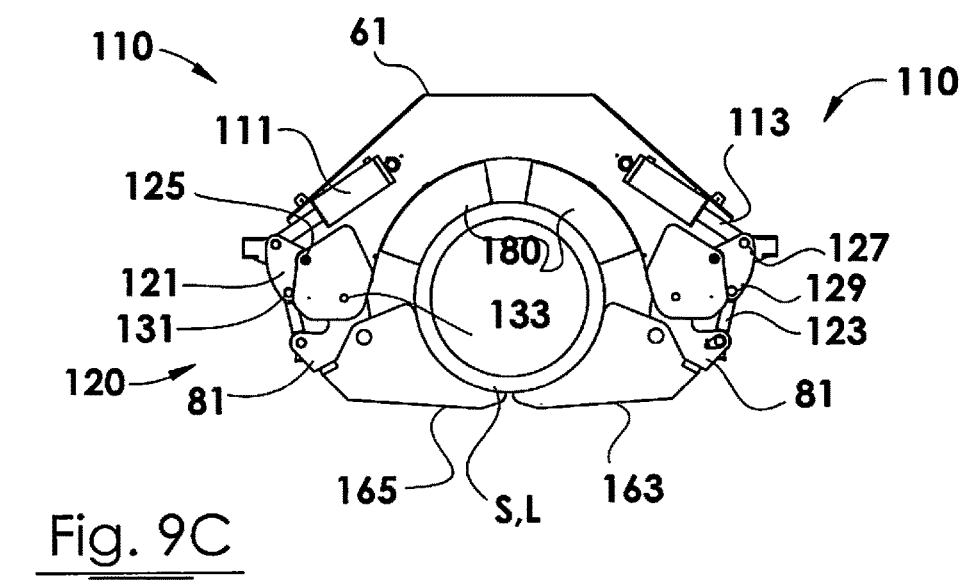
FIG. 9C is a front elevation view illustrating the operation of the cylinders/pistons and linkages of the jaw of FIG. 7A to tightly grip the pipe/pipeline.

Turning to FIGS. 9A, 9B and 9C, the left and right actuators 110 are connected between the replacement lower left and right complemental jaws 163 and 165 and their respective left and right portions of the half jaw 61. As shown, the left and right actuators 110 are mirrored in relation to the plane 73. Each actuator 110 includes a cylinder 111 and piston 113 and a linkage 120 serially connected between their respective lower replacement left and right complemental jaws 163 and 165 and left and right portions of the half jaw 61. Each linkage 120 preferably includes a toggle 121 and a link 123. The toggle 121 is pivoted at a first axis 125 on the upper half jaw 61. It is also pivotally connected at a second axis 127 to the piston 113 of its respective cylinder 111 and at a third axis 129 to one end of the link 123. The link 123 is also pivotally connected at a fourth axis 131 at its other end to the complemental jaw adapter hub 81 which is pivotally mounted at a fifth axis 133 on the lower portion of the upper half jaw 61. The replacement complemental jaw 163 or 165 is secured to and moves in unison with its respective complemental jaw hub 81 as explained in relation to FIGS. 6A and 6B and the complemental jaws 63 and 65. The axes 125, 127, 129, 131 and 133 are parallel.

When an actuator piston 113 is retracted into its cylinder 111, its toggle 121 is pivoted on the first axis 125 toward the cylinder 111. The toggle 121 pulls the link 123 in tension, causing its complemental jaw hub 81 to rotate about its pivot axis 97. The replacement complemental jaw 163 or 165 moves in unison with its hub 81, opening the complemental jaw 163 or 165. When an actuator piston 113 is extended from its cylinder 111, its toggle 121 is pivoted on the first axis 125 away from the cylinder 111. The toggle 125 pushes the link 123 in compression, causing its complemental jaw hub 81 to rotate about its pivot axis 133. The complemental jaw 163 or 165 moves in unison with its hub 81, closing the complemental jaw 163 or 165. The linkage 120 provides such a mechanical advantage between its respective cylinder 111 and complemental jaw 163 or 165 as to assure that sufficient resistance to deviation of the pipeline L and/or pipe stick S from round during manipulation by the machine 10 is maintained as long as the grip is closed on the pipeline L and/or pipe stick S and that it resists axial slippage.

Hydraulic System

Figure 10:
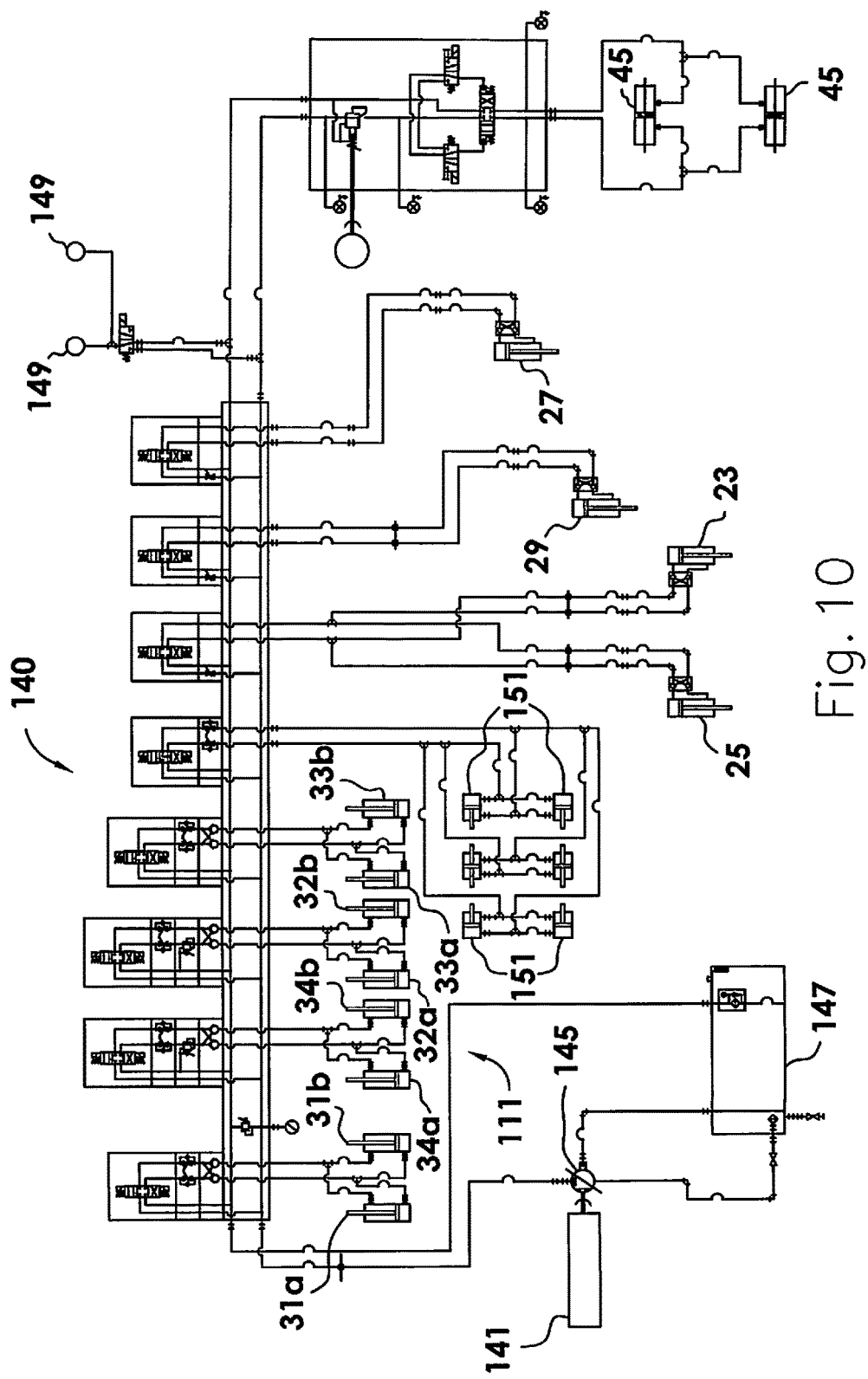
FIG. 10 is a schematic diagram of the hydraulic system of the machine of FIG. 1.

Turning to FIG. 10, the machine hydraulic system 140 includes an engine 141, preferably an industrial liquid cooled diesel engine, closed loop track drive pumps 143, an auxiliary open loop pump 145 and a hydraulic fluid reservoir 147. The system 140 powers right and left track motors 149 to drive and steer the machine 10 from one fusion location to another and into operating positions in which the machine 10 can pick up, manipulate and/or fuse pipeline L and pipe sticks S. The elevation and level of the gantry 20 is varied by simultaneous operation of the two front gantry telescoping cylinders 23 and 25 and independent operation of the two rear gantry telescoping cylinders 27 and 29 to raise and lower the corners of the gantry 20 as necessary. The spacing of the fixed and sliding jaws 60 is controlled by operation of the carriage cylinders 45 to reciprocate the sliding jaws on the guide rods 37. The fusion machine jaws 60 are opened and closed by operation of their respective actuator cylinders 31a and 31b, 34a and 34b, 32a and 32b and 33a and 33c. As seen in FIGS. 9A, 9B and 9C, operation of the actuator cylinders 111 in one direction causes the lower left and right complemental jaws 63 and 65 or replacements 163 and 165 to rotate to an opened condition in which the upper half jaw 61 can be lowered onto and lifted from the pipe sticks S and/or pipeline L to be fused. Operation of the cylinders 111 in the opposite direction causes the lower left and right complemental jaws 63 and 65 or replacements 163 and 165 to rotate to a closed condition in which the pipe sticks S and/or pipeline L to be fused are gripped so substantially around their circumferences as to resist their deviation from round during manipulation by the machine 10 and to prevent slippage. The machine may also include a number of stripper cylinders 151 for use in removal of the heater during separation of the jaws after heating.

Operation

Assume for the exemplary application herein described that several sticks S of pipe to be fused into a pipeline L are in end-to-end alignment with the pipeline L, that the jaws 60 of the fusion machine 10 have been equipped with complemental jaws 63 and 65 or replacements 163 and 165 and half jaw inserts 180 corresponding to the pipe outer diameter and that the fourth jaw 34, if any, has been secured for operation in the 2×2 configuration. Assume further that it is desirable that the pipeline L be manipulated by the fixed jaws 31 and 34 and the pipe stick S be manipulated by the sliding jaws 32 and 33.

In performing the fusion process, the operator opens the complemental jaws 63 and 65 or replacements 163 and 165 to a fully opened configuration and adjusts the gantry 20 to a level suitable for the pipe stick S to be received in the carriage assembly 30. The operator then drives the machine 10 into a position in which the tracks 21 straddle, the gantry 20 spans across and the carriage assembly 30 is aligned with the pipe stick S to be fused with the sliding jaws 32 and 33 proximate the end of the pipe stick S to be fused.

In this position, the operator lowers the gantry 20 and begins closing the sliding complemental jaws 63 and 65 or 163 and 165 as the tips drop below the midpoint of the pipe stick circumference. Lowering of the gantry 20 can, but need not necessarily, continue until the tips of the complemental jaw 63 and 65 or 163 and 165 contact the ground G. Closing of the complemental jaws 63 and 65 or 163 and 165 continues until they are in the fully closed condition. At this point, the complemental jaws 63 and 65 or 163 and 165 and half jaw 61, or half jaw inserts 180, if necessary, tightly grip the pipe stick S.

Once the pipe stick S is gripped, the gantry 20 can be raised, if necessary, to lift the gripped end of the pipe stick S above ground G. The operator can then drive the machine 10 and further change the elevation of the gantry 20 to a condition in which the gripped end of the pipe stick S is proximate, higher than and in longitudinal alignment with the end of the pipeline L to which the pipe stick S will be fused and the fixed jaws 31 and 34 are aligned above the end of the pipeline L to which the pipe stick S will be fused.

In this position, the operator again lowers the gantry 20 and begins closing the fixed complemental jaws 63 and 65 or 163 and 165 as the tips of the fixed complemental jaws 63 and 65 or 163 and 165 drop below the midpoint of the pipeline circumference. Lowering of the gantry 20 can, but need not necessarily, continue until the tips of the complemental jaw 63 and 65 or 163 and 165 contact the ground G. Closing of the complemental jaws 63 and 65 or 163 and 165 continues until they are in the fully closed condition. At this point, the complemental jaws 63 and 65 or 163 and 165 and half jaw 61, or half jaw inserts 180, if necessary, tightly grip the pipeline L.

Once the pipeline L is gripped, the gantry 20 can be raised to lift the gripped ends of the pipe stick S and pipeline L above ground G to fusion level. With the center axes 75 of the pipeline L and pipe stick S longitudinally aligned at fusion level, the operator adjusts the spacing between the fixed 32 and 33 and sliding jaws 32 and 33, if necessary, inserts the facer assembly 15 into a suitable facing position between the fixed 31 and 34 and sliding jaws 32 and 33 and closes the spacing to bring the pipeline L and pipe stick S into abutment with opposite sides of the facer.

After facing, the operator spreads the spacing between the fixed 31 and 34 and sliding jaws 32 and 33, removes the facer assembly 15 from the space, prepares a heater assembly 17 for insertion between the ends of the pipeline L and pipe stick S to be fused, adjusts the spacing if necessary to receive the heater assembly 17, inserts the heater assembly 17 into a suitable heating position between the fixed 31 and 34 and sliding 32 and 33 jaws and closes the spacing to bring the pipeline L and pipe stick S into abutment with opposite sides of the heater.

After heating, the operator spreads the spacing between the fixed 31 and 34 and sliding 32 and 33 jaws, removes the heater assembly 17 and closes the spacing to bring the molten ends of the pipeline L and pipe stick S together. This condition is maintained under force until the joint has cooled sufficiently.

Once the joint has cooled, the operator lowers the gantry 20 and opens all of the jaws 60 simultaneously to release the fused pipeline L to the ground G. This completes this exemplary fusion process for one pipe stick S. The operator can then raise the gantry 20 sufficiently to allow the machine 10 to be driven forward from the fused pipe stick S to another pipe stick S for repetition of the process.

In some applications, rather than the exemplary process as above described, it may be desirable to use the fusion machine 10 to bring the pipe sticks S into their end-to-end alignment with the pipeline L at the beginning of the process, and/or to secure the fourth jaw 34 to the sliding jaw 32 rather than to the fixed jaw 31 and/or to apply the fixed jaws 31 and 34 to the pipe stick S and sliding jaws 32 and 33 to the pipeline L.

The fusion process can be performed using known facer and heater assemblies 15 and 17 and methods for control of the relative axial movement of the sliding jaw or jaws with respect to the fixed jaws, examples of which are disclosed in U.S. Pat. Nos. 5,814,182, 6,021,832, 6,212,747 and 6,212,748.

Thus, it is apparent that there has been provided, in accordance with the invention, a straddle-mounted pipe fusion machine that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For fusing polyolefin pipes of selected outside radius end-to-end, a machine comprising:
   a gantry;
   a pair of spaced apart tracks;
   telescoping legs mounted at the front and rear of each of said spaced apart tracks and supporting pair of spaced apart said gantry above said tracks;
   an upper half jaw supported below said gantry and having an inner radius substantially equal to the selected outside radius of the pipes being fused;
   lower left and right complemental jaws each having an inner radius substantially equal to said inner radius of said upper half jaw; and
   left and right pivots connecting said lower left and right complemental jaws to left and right portions of said half jaw, respectively.

2. A machine according to claim 1 further comprising a carriage mounted on said gantry, said carriage having spaced parallel guide rods.

3. A machine according to claim 2, said upper half jaw being fixed on said guide rods and the machine further comprising:
   at least one other upper half jaw slidable on said guide rods toward and away from said upper half jaw, said at least one other upper half jaw having an inner radius substantially equal to the outside radius of the pipes being fused;
   at least one other lower left and other lower right complemental jaw, each having an inner radius substantially equal to said inner radius of said upper half jaw; and
   at least one other left and other right pivot, each connecting a corresponding said other lower left and right complemental jaws to left and right portions of said other half jaw, respectively.

4. For fusing polyolefin pipes end-to-end, a machine comprising:
   two spaced apart tracks, each of said spaced apart tracks having two telescoping legs spaced thereon;
   a gantry supported by said telescoping legs and spanning between said spaced apart tracks;
   a carriage mounted on said gantry, said carriage having spaced parallel guide rods;
   a first jaw fixed on said guide rods and adapted to receive and grip a first pipe during downward motion of said gantry toward the first pipe;
   a second jaw slidable on said guide rods toward and away from said first jaw and adapted to receive and grip a second pipe during downward motion of said gantry toward the second pipe; and
   means for reciprocating said second jaw toward and away from said first jaw.

5. A machine according to claim 4 further comprising a facer mounted on said gantry for insertion to and withdrawal from alignment between spaced-apart proximal ends of the first and second pipes.

6. A machine according to claim 4 further comprising a heater mounted on said gantry for insertion to and withdrawal from alignment between spaced-apart proximal ends of the first and second pipes.

7. A machine according to claim 4 further comprising a facer mounted on said gantry for insertion to and withdrawal from alignment between spaced-apart proximal ends of the first and second pipes and a heater mounted on said gantry for insertion to and withdrawal from alignment between spaced-apart proximal ends of the first and second pipes.

8. A machine according to claim 4 further comprising a third jaw slidable on said guide rods in unison with said second jaw and adapted to receive and grip said second pipe simultaneously with said second jaw.

* * * * *